(12) United States Patent
Garlett et al.

(10) Patent No.: US 7,680,179 B2
(45) Date of Patent: *Mar. 16, 2010

(54) DATA COMMUNICATION SYSTEM WITH SELF-TEST FEATURE

(75) Inventors: Jon David Garlett, Wappingers Falls, NY (US); Victor Moy, Poughkeepsie, NY (US); Michael A. Sorna, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,581

(22) Filed: Aug. 29, 2007

(65) Prior Publication Data

US 2008/0049819 A1 Feb. 28, 2008

Related U.S. Application Data

(63) Continuation of application No. 10/064,387, filed on Jul. 9, 2002, now Pat. No. 7,321,617.

(51) Int. Cl.
*H04B 17/00* (2006.01)
*G01R 13/00* (2006.01)

(52) U.S. Cl. ............................... 375/226; 702/69

(58) Field of Classification Search ............... 375/224, 375/226; 324/76.54, 76.74; 702/69; 713/501, 713/502
See application file for complete search history.

(56) References Cited

U.S. PATENT DOCUMENTS

| 4,672,307 | A * | 6/1987 | Breuer et al. | 714/738 |
| 6,335,645 | B1 * | 1/2002 | Matsuo et al. | 327/141 |
| 6,393,594 | B1 * | 5/2002 | Anderson et al. | 714/738 |
| 2003/0021464 | A1 * | 1/2003 | Takeoka et al. | 382/145 |

* cited by examiner

*Primary Examiner*—Young T. Tse
(74) *Attorney, Agent, or Firm*—Dillon & Yudell, LLP

(57) ABSTRACT

A data communication system includes circuitry to assure components respond to variations in the time length of the valid data window or "eye" of the high speed data communication signal. A self-test portion of the system periodically injects the effects of phase jitter into the data communication signal to assure the system performs properly.

12 Claims, 4 Drawing Sheets

US 7,680,179 B2

DATA COMMUNICATION SYSTEM WITH SELF-TEST FEATURE

PRIORITY CLAIM

The present application is a continuation of Ser. No. 10/064,387 filed Jul. 9, 2002 now U.S. Pat. No. 7,321,617 "Data Communication System With Self-Test Feature" which issued on Jan. 22, 2008.

BACKGROUND OF THE INVENTION

1. Technical Field

The present invention relates to high speed data communication systems having self-test features. More specifically, the present invention provides a communication system with the capability to periodically assure proper performance and receipt of data during variations in the time length of the data window or "eye" of signals in the communication system.

2. Description of the Related Art

In high speed data communication systems, particularly those over a fiberoptic cable, it is desirable both during assembly and installation of the components, as well as periodically during service thereafter, to test these systems and verify proper receipt and performance of data in the system. The term "eye" is a well known communications term used to define the valid data window available to the circuitry that is expected to receive the signal from the cable.

An example of an eye or signal window in ideal form is depicted in a set of eyes 10 occurring repeatedly as a function of time in a signal waveform 12 in FIG. 1. In FIG. 2, an eye 14 is depicted as a function of time of the type representing an example of a signal window actually present in a received waveform 16. Areas 18 and 20 preceding and following the eye 14 represent the effect of noise and other factors which can be present in signals typically present in data transmission network. It can be seen that the waveform time duration of the eye 14 is considerably less than the bit time of the ideal time window or eye 10 in FIG. 1. This is caused by many things that affect the time delay of an actual signal from one end to the other end of the data transmission system.

Jitter is a commonly used term to refer to the time variation between the transmitted bits. Jitter is measured for high speed data transmission in time intervals such as pico seconds (1 pico second=$10^{-9}$ sec.). If the jitter is too great from one transmitted bit to another transmitted bit, the eye becomes so short as to in effect cease to exist. Data transmission is not then possible either in the equipment under test or over an installed network. It is important to evaluate the response of communication networks and equipment to the effects of jitter. It would thus be desirable to be able to test high speed communication systems, both during assembly and installation and also during subsequent service, to determine the ability of a system and its components to respond to fluctuations or changes in the time length of the data window or "eye" of signals.

SUMMARY OF THE INVENTION

It is an object of the present invention to provide a high speed data communication system having the capability to inject time changes in data windows of the signals for testing purposes.

It is a further object of the present invention to provide a self-test system for high speed data communication to allow to testing of the effect of noise and other undesirable effects on communication capabilities to receive signals and assure that the system is able to sample and receive an actual signal from a fiber optic cable in a noisy customer environment.

The above and other objects are achieved as is now described. A high speed data communication system is provided with stations having self-test features. The stations include a self-test system to adjust on a random time interval basis the time duration of data windows present in a data signal. A time adjust system introduces time changes in a data window during which the signal may be present to be sensed. An activator system operating on a random or unpredictably occurring basis enables the time adjust system to introduce time delays in the data window.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
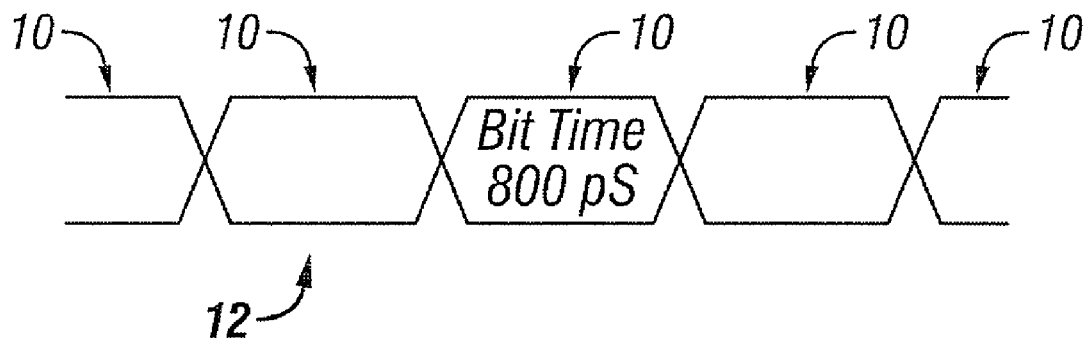
FIG. 1 is a waveform diagram of an ideal data window or eye for a high speed data communication system.
Figure 2:
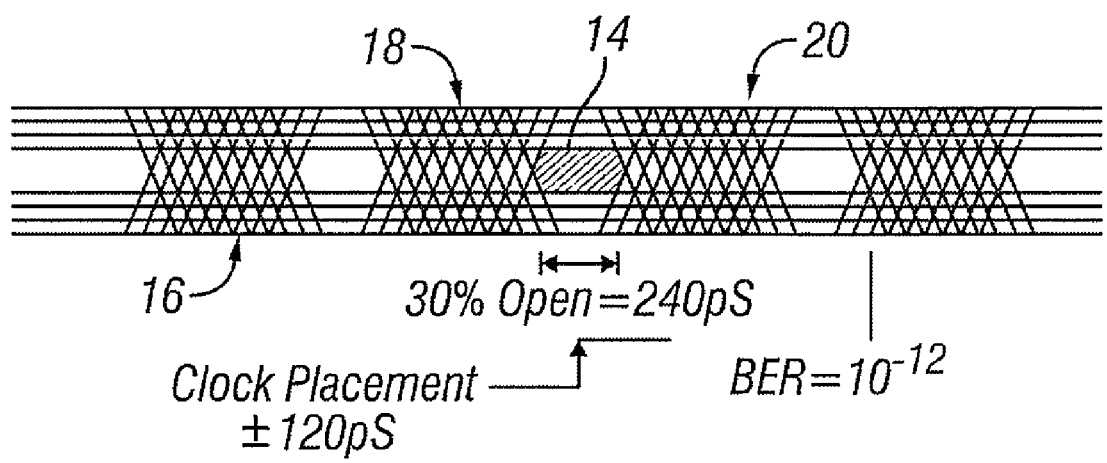
FIG. 2 is a waveform diagram of an actual data window or eye in a high speed data communication system.

An example of an eye or signal window in ideal form is depicted in a set of eyes 10 occurring repeatedly as a function of time in a signal waveform 12 in FIG. 1. In a typical high speed fiber optic data communication network, the operating frequency is 1.25 Gb/s and the bit time duration of the eye or data window 10 in ideal conditions is 800 pico seconds, (1 pico second=$10^{-9}$ sec.) In FIG. 2, an eye 14 is depicted as a function of time of the type actually present in a received waveform 16. Areas 18 and 20 preceding and following the eye 14 represent the effect of noise and other factors which can be present in signals typically present in data transmission network. The bit time duration of eye 14 is 240 pico seconds, only thirty percent of that of the eye 10 under ideal conditions. This allows variation in clock placement of only ±120 pico seconds. It can be seen that the waveform time duration of the eye 14 is considerably less than the bit time of the ideal time window or eye 10 in FIG. 1. This is caused by many things that affect the time delay of an actual signal from one end to the other end of the data transmission system.

Jitter is a commonly used term to refer to the time variation between the transmitted bits. Jitter is measured for high speed data transmission in time intervals such as pico seconds. If the jitter is too great from one transmitted bit to another transmitted bit, the eye becomes so short as to in effect cease to exist and data transmission is not possible either in the equipment under test or over an installed network.

Figure 3:
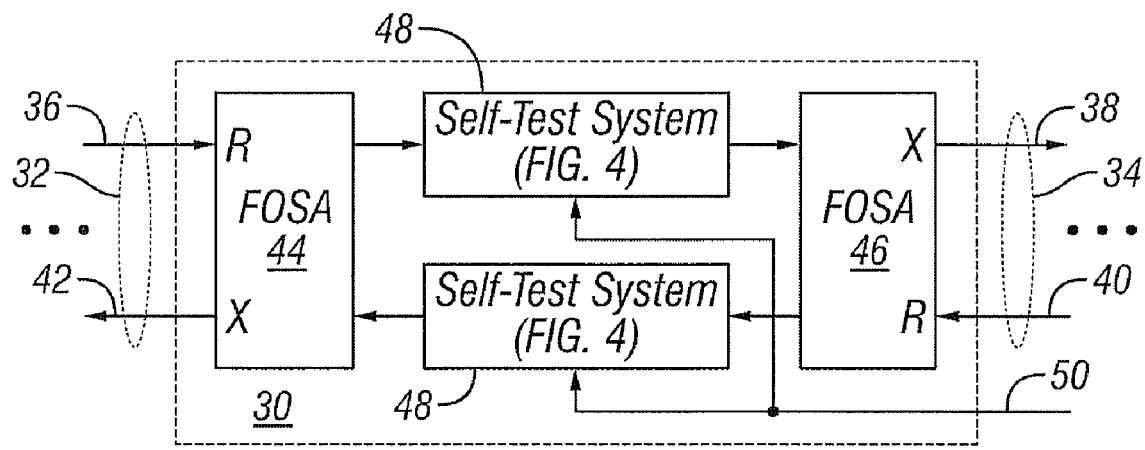
FIG. 3 is a block diagram of a high speed data communication system according to the present invention.

Referring to FIG. 3, an embodiment of a data transmission system or network in accordance with the present invention is shown. The data transmission system is composed of a series of stations 30, one of which is depicted, arranged in a fiber optic network. Each of the stations 30 is connected between fibers 32 and 34 for communication with other stations of like configuration to the one shown in FIG. 3.

The stations are preferably bidirectional, receiving incoming high speed data from source 36 in a waveform and at a high speed data frequency, such as 1.25 GHz in the preferred embodiment, like that shown in ideal form in FIG. 1, but in actual form more like that of FIG. 2, and transmitting the data to a target 38 in one direction, while also receiving incoming high speed data from source 40 for transmission to a target 42. If desired, the present invention may be utilized in unidirectional stations, or in test stations during assembly of the data transmission network.

The station 30 includes a conventional fiber optic subassembly 44 for interface with the fiber 32 and a conventional fiber optic subassembly 46 for interface with fiber 34.

According to the present invention, a self-test system 48 (FIGS. 3 and 4) is included in the station 30 for each direction of data flow in the high speed data transmission network. As will be set forth, the self-test system 48 adjusts on a random basis the time period or eye in which data windows are present in data signals in the fiber optic network. The self-test system 48 is activated to include the effects of jitter by signals over an input 50 on a basis chosen by equipment operator or some suitable periodic test schedule. If desired, the self-test system can be kept continually active to randomly adjust the data window or eye to test the communication capability of the data network. As noted above, the self-test system 48 may also be used during initial assembly and connection of the fibers between stations in the network.

Figure 4:
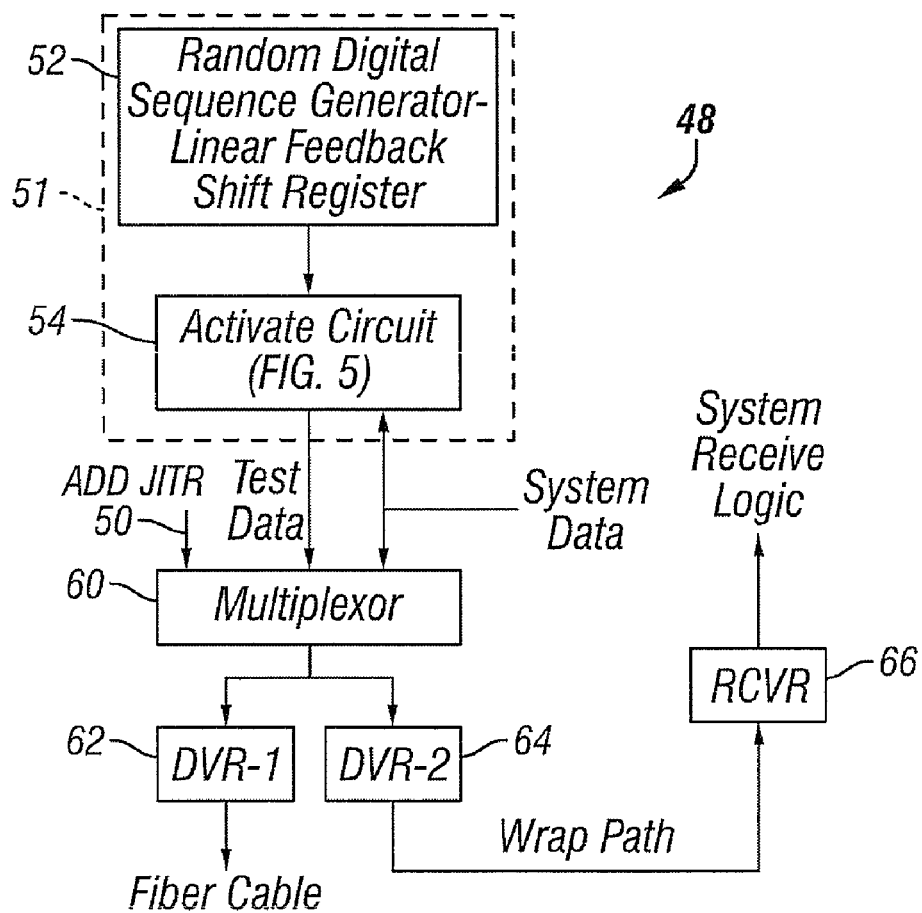
FIG. 4 is a block diagram of a self-test system of the high speed data communication system of FIG. 3.

As depicted in FIG. 4, the self-test system 48 includes a random digital sequence generator 52 which issues a series of digital "1" and "0" bits in a random sequence. A suitable random digital sequence generator 52, for example, takes the form of a linear feedback shift register to generate the random sequence of digital bits. The random output sequence of digital bits from the generator 52 is furnished to an activate circuit 54. In one embodiment, the random digital sequence generator 52 and the activate circuit 54 are included within a single component, referred to as the activator 51. As will be set forth, the activate circuit 54 includes a time adjust system 56 (FIG. 5) which, on receipt of signals on line 50 introduces time delay or jitter in the data windows. At such times, the activate circuit 54 sends test data in the form of the random digital sequence from generator 52, but in data windows or eyes which are delayed in the opening or advanced in their closing, or both, like the data windows 14 of FIG. 2.

In this manner, the ability of the data communication system to transmit and receive data in the presence of jitter or other adverse effects may be tested. As has been noted, this testing may be performed during installation or set-up of the system or during regular operation thereafter.

A multiplexor 60 is connected to receive the system data in parallel form from either one of the fiber optic subassemblies 44 or 46 through the activate circuit 54 (FIGS. 4 and 5) at one input, and test data from the time adjust system 56 at the other input. Control signals over the input 50 provide a test setting indication, or control, of multiplexor 60 as to whether system data or test data passes through multiplexor 60. Depending on the test setting, multiplexer 60 furnishes either system data or test data in serial form to optical cable drive assemblies 62 and 64. Optical cable driver 62 is located in the transmit portion of each of the fiber optic subassemblies 44 and 46 and sends data presented to it over the fiber 32 or 34 as the case may be.

The driver 64 forms optical pulses representing the serial data bits presented it by multiplexer 60 to the receiver optics section 66 of the fiber optic subassembly 44 or 46, from where it is presented in parallel form to the receive logic for either normal processing or for evaluation of the ability of the network to perform in the presence of jitter or other undesirable effects. Thus, it can be seen that the system shown in FIG. 4 also serves as a serializer/deserializer according to the present invention.

As has been set forth, the activate circuit 54 receives the random sequence of digital bits from generator 52. Activate circuit 54 in effect scans that random digital sequence for the presence of certain designated sequences. When these sequences are detected as occurring, the multiplexer 60 furnishes random sequences of digital bits in time adjusted data windows or eyes like those depicted in FIG. 2. In the preferred embodiment, the designated sequences of bits are four consecutive "1" bits and four consecutive "0" bits. It should be understood that other sequences maybe selected and detected with appropriate adjustment of the gating logic in activate circuit 54.

In the self-test system 48 of FIG. 4, the data path for normal system operation starts with SYSTEM DATA input to multiplexor 60 as serial data signals from activate circuit 54. This is the serial data that is intended to be transmitted over the 1.25 Gb/s fiber optic cable to a second location some distance away. In normal operation mode, as indicated by an appropriate signal on input 50, SYSTEM DATA is selected by the multiplexor 60 and directed through the fiber optic cable driver 62 to the fiber optic cable 32 or 34. The driver circuit 62 converts the data signal from electronic pulses into light pulses.

The second mode of operation or TEST MODE, where indicated on input 50, of testing of the station 30 by itself during installation does not require the fiber optic cable 32 or 34. The logical path starts with the random digital sequence generator or shift register 52. The output of register 52 is a random sequence of digital bits to simulate actual system data during testing. The test data is sent to the activate circuit 54.

Activate circuit 54 during the TEST MODE simulates the shutting of the eye 14 of the transmitted signal at the far end or receive end of the fiber optic cable. The activate circuit 54 shuts the eye 14 of the transmitted signal as it appears at the output of driver 64 in accordance with an algorithm that looks at the sequence of bits coming from the shift register 52.

In the preferred embodiment, the specific algorithm selected is to look for a sequence of four consecutive "1"s or four consecutive "0"s. When either condition is detected by the activate circuit 54, the leading edge of the transition of the data is delayed and the trailing edge transition of data is made to occur early.

The time adjustment for the delay in the preferred embodiment and in effect the time speed up of the trailing transition is set to be the same time value, specifically one-quarter of a bit period or 0.25*T, where T is the bit time period. The result is that the eye or data valid window goes from T to 0.5T. The system electronics must, of course, pass this test to operate reliably at the smallest eye value.

Figure 5:
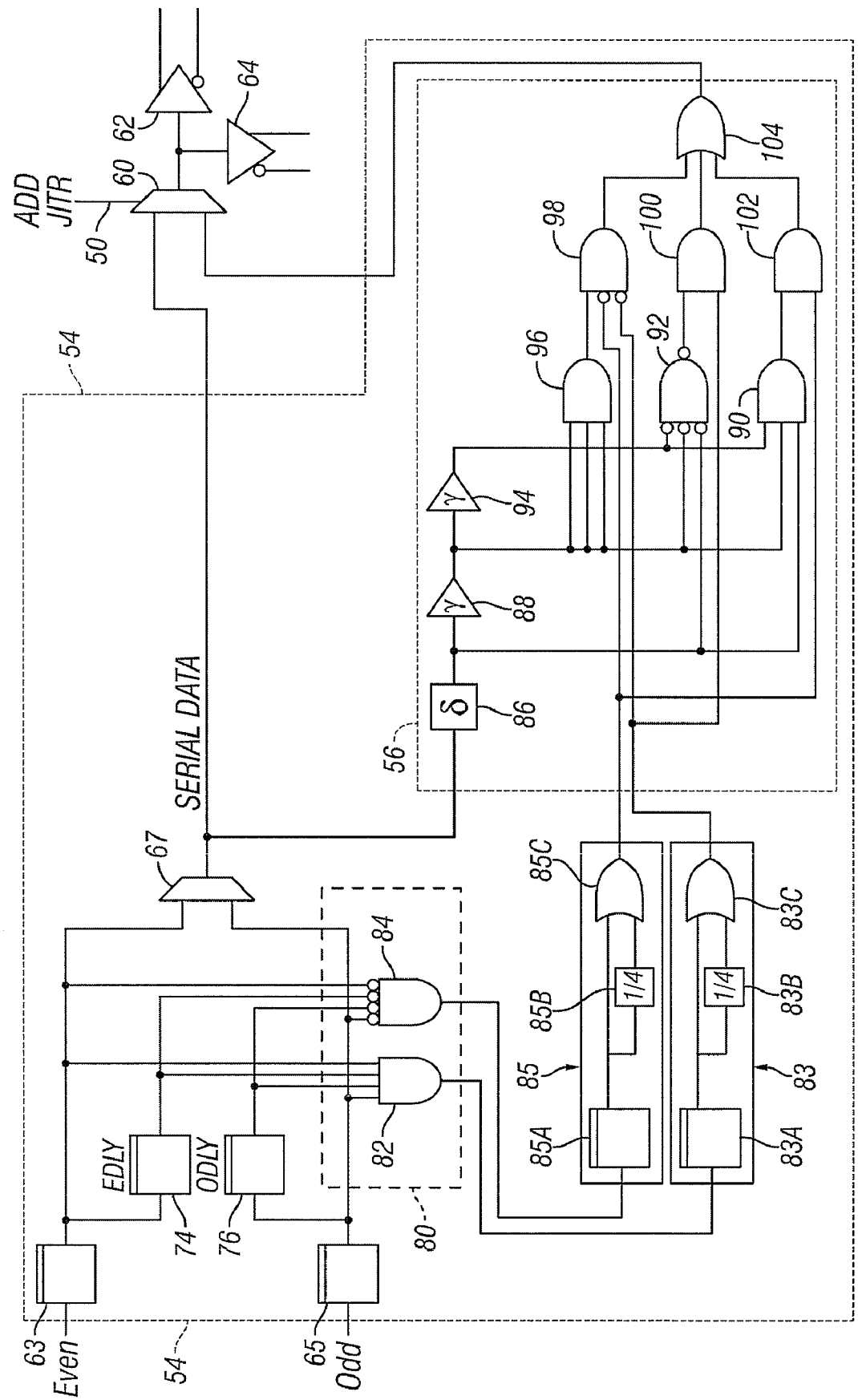
FIG. 5 is a block diagram of a functional component of the self-test system of FIG. 4.

FIG. 5 in the drawings depicts a preferred embodiment of the activate circuit 54. The incoming stream of bits, whether SYSTEM DATA or a random series of bits from the random sequence generator 52, is fed to each of a pair of latches 63 and 65. The latches 63 and 65 are set to operate and store alternating bits, "ODD" and "EVEN", in the sequence of bits received from the generator 52. Latch 63 is termed an even bit latch and latch 65 is termed an odd bit latch. The latches 63 and 65 are connected to a multiplexer 67 where the alternating bits are recombined. Thus, either SYSTEM DATA or serial test data in the recombined form of the original random bit sequence from the generator 52, is presented to the multiplexer 60. The multiplexer 60 allows the bit sequence to pass to an amplifier of driver 62 and to an amplifier in driver 64.

Figure 6:
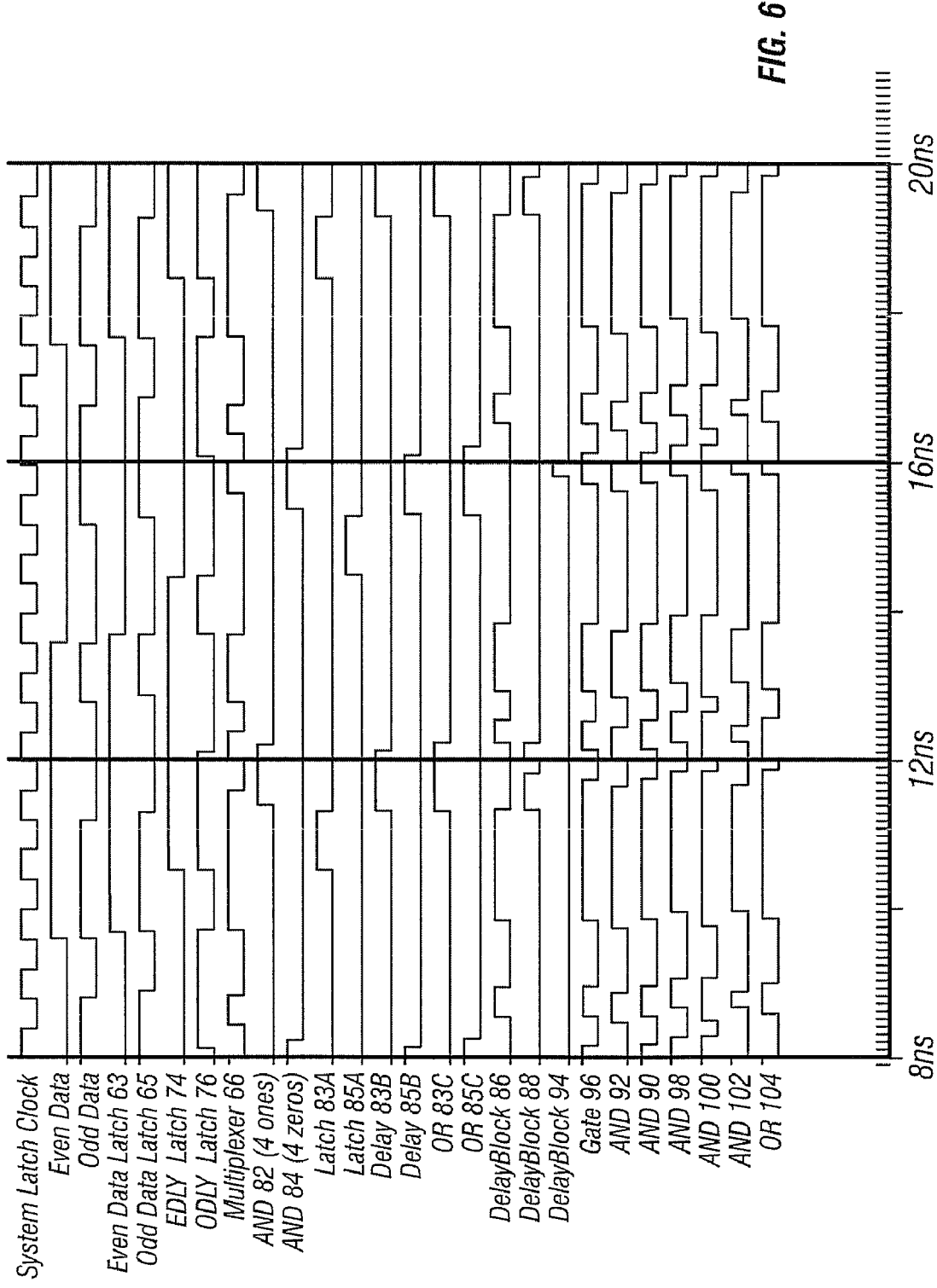
FIG. 6 is a waveform diagram of example waveforms present in the structure of FIG. 5.

The even latch 63 is also connected to an even delay latch 74 and the odd latch 65 is connected to an odd delay latch 76. The latches 63 and 74 thus indicate one set, the even set, or second and fourth of the four most recent bits in the incoming random bit sequence from random generator 52. Latches 65 and 76 indicate the other or odd set, the first and third, of the four most recent random bits from the random generator 52. The latches in FIG. 5 are driven by a system latch clock signal (FIG. 6). FIG. 6 also shows example outputs from the components of FIG. 5 described below during their operation.

A decode gating circuit 80 is connected to the outputs of each of the four latches 62, 65, 74 and 76. The decode gating circuit 80 is configured to indicate when the selected sequence of bits described above is present. As has been set forth, in the preferred embodiment, the desired sequence is the presence of either four consecutive "1"bits or 1111, or four consecutive "0" bits, or 0000, in the output from the generator 52. Thus, in the preferred embodiment a logic element or function 82 detects the presence of the 1111 bits in the four latches and forms a FOUR ONES signal at its output. The FOUR ONES output of logic element 82 is furnished to a stretcher or delay circuit 83 formed by a latch 83A, a delay element 83B having a delay of ¼ of a bit period, and an OR element or function 83C. The latch 83A delays the output of logic 82 by 2 bit periods.

Similarly, a logic element 84 detects the presence of 0000 bits in the four latches and forms a FOUR ZEROS signal at its output. The FOUR ONES output of logic element 84 is furnished to a stretcher or delay circuit 85 formed by a latch 85A, a delay element 85B having a delay of ¼ of a bit period, and an OR element or function 85C. The latch 85A delays the output of logic 84 by 2 bit periods. The FOUR ONES and FOUR ZEROS signals, when present, are in effect realigned with the serial data stream in their respective delay circuits 83 and 85. The delayed FOUR ONES and FOUR ZEROS signals are provided to the time adjust system 56.

The time adjust system 56 further receives the serial data from the multiplexer 67 at a delay block circuit 86 which introduces a delay δ. The delay δ is set to be ¼ of a bit period. The output of delay circuit 86 is furnished to a delay circuit 88, which includes a delay γ which is set to be ¼ of a bit period, and to each of a pair of logic functions 90 and 92. The output of delay circuit 88 is furnished to a delay circuit 94 which includes a delay γ which is set to be ¼ of a bit period. The output of delay circuit 88 is also sent to logic functions 90 and 92, and to a third logic function or gate 96. The delay circuit 94 is sent as an input to the logic functions 90 and 92.

A logic function 98 is connected to receive output of logic function 96, as well as signals from gating circuit 80 indicating absence of both the 1111 and 0000 sequences. A logic function 100 is connected to the output of logic function 92 as well as to the FOUR ZEROS signal from gating circuit 80. A logic function 102 is connected to the output of logic function 90, as well as to the FOUR ONES signal from gating circuit 80.

The outputs from the logic function 98, 100 and 102 are furnished to an OR logic function 104 which in turn is connected to the multiplexor 60. The multiplexor 60 is arranged to normally pass serial data, as has been set forth. In the event of an activation indication from line 50 to add jitter, the multiplexor 60 instead allows signals to pass to an amplifier in drivers 62 and 64 according to the logic functions performed in the gating circuit 80. The operation of the logic functions in gating circuit 80 may be implemented by individual logic elements as shown schematically in the drawings or in an application specific integrating circuit or ASIC or some other arrangement according to the following logic equation:

$$OUT = norm \cdot \overline{FOUR\ ZEROS} \cdot \overline{FOUR\ ONES} +$$
$$FOUR\ ONES \cdot (\overline{early \cdot \overline{norm} \cdot late}) +$$
$$FOUR\ ZEROS\ (early \cdot norm \cdot late)$$

Accordingly, it can be seen that the present invention provides a data transmission system with a self-test system to simulate jitter effects and reduction of the data window or eye either during actual operations, during manufacturing test, or during installation and setup of the data transmission system. The present invention thus allows the data transmission system to be evaluated to assure that the components of the system and the overall system are able to sample and receive an actual system during operational conditions of a noisy customer environment.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A data communication system, comprising:
   a transmitter for transmitting data;
   a receiver for receiving the data; and
   a self-test circuit coupling the data transmitted from the transmitter to the receiver, and for reducing a time period during which the data can be received by the receiver, said self-test circuit including:
   a random digital sequence generator capable of selectively issuing a series of digital 1 and 0 bits in a random sequence; and
   an activate circuit coupled to an output of the sequence generator and which responds to receipt of a pre-set sequence of the digital bits from the sequence generator by initiating a self-test operation by which the data communication system dynamically adjusts, on a random basis, the time period in which data windows are present within transmitting data signals, wherein the pre-set sequence indicates transmission of test data and addition of jitter to other systems to perform the self-test operation.

2. A self-test system for randomly adjusting a time period in which data windows are present in a data signal, comprising:
a time adjust system introducing time changes in a data window during which the data signal is sensed; and
a circuit that enables, on a random time basis, the self-test system to enter into a test mode of operation, and trigger the time adjust system to introduce time delays in the data window;
wherein the time adjust system provides a delayed, test data, which is provided to an output component that accepts the delayed, test data as an output of the self-test system when the self-test system is in the test mode.

3. The self-test system of claim 2, wherein the time adjust system introduces at least one time delay in an opening of the data window and an advance in a closing of the data window.

4. The self-test system of claim 2, further comprising a random digital sequence generator for generating a random series of bits to the circuit.

5. The self-test system of claim 4, wherein the random digital sequence generator comprises a linear feedback shift register.

6. The self-test system of claim 5, wherein the circuit includes a decoder for detecting the presence of a defined sequence of digital code in a random digital number output of the random digital sequence generator, wherein the defined sequence of digital code triggers an entry of the self-test system into the test mode of operation.

7. The self-test system of claim 2, wherein:
the circuit comprises:
a plurality of latches which receive even and odd alternating bits of an original sequence of incoming data bits;
a multiplexer having inputs coupled to outputs of the plurality of latches and which recombines the incoming data bits into the original sequence; and
a decode gating circuit coupled to the outputs of the plurality of latches and configured to identify when a pre-set sequence of digital bits is received at the circuit; and
wherein the time adjust system comprises a delay circuit, and the time adjust system receives the original sequence and one or more outputs from the decode gating circuit and generates one or more delayed outputs.

8. A data communication system having a self-test system, said data communication system comprising:
a time adjust system introducing time changes in a data window during which a data signal is sensed; and
a circuit for periodically activating, on a random basis, the self-test system to enter into a test mode of operation, and trigger the time adjust system to introduce time delays in the data window;
wherein the time adjust system provides a delayed, test data, which is provided to an output component that accepts the delayed, test data as an output of the self-test system when the self-test system is in the test mode.

9. The data communication system of claim 8, wherein the time adjust system introduces at least one time delay in opening the data window and an advance in closing the data window.

10. The data communication system of claim 8, further comprising a random digital sequence generator for generating a random series of bits to the circuit.

11. The data communication system of claim 10, wherein the circuit includes a decoder for detecting the presence of a defined sequence of digital code in a random digital sequence output of the random digital sequence generator, wherein the defined sequence of digital code triggers an entry of the self-test system into the test mode of operation.

12. The data communication system of claim 8, further comprising: a random digital sequence generator capable of selectively issuing a series of digital 1 and 0 bits in a random sequence; and
wherein said circuit for periodically activating is an activate circuit coupled to an output of the sequence generator and which responds to receipt of a pre-set sequence of digital bits from the sequence generator by initiating a self-test operation by which the data communication system dynamically adjusts, on a random basis, a time period in which data windows are present within transmitted data signals, wherein the pre-set sequence indicates transmission of test data and addition of jitter to the data communication system to perform the self-test operation.

* * * * *